May 24, 1932. L. R. KOLLER 1,860,187

TEMPERATURE CONTROLLING AND MEASURING APPARATUS

Filed April 24, 1929

Inventor:
Lewis R. Koller,
by Charles E. Tulla
His Attorney.

Patented May 24, 1932

1,860,187

UNITED STATES PATENT OFFICE

LEWIS R. KOLLER, OF SCHENECTADY, NEW YORK, ASSIGNOR TO GENERAL ELECTRIC COMPANY, A CORPORATION OF NEW YORK

TEMPERATURE CONTROLLING AND MEASURING APPARATUS

Application filed April 24, 1929. Serial No. 357,848.

The present invention relates to temperature controlling and measuring apparatus and more particularly to temperature regulators operative in the range of 80° to 150° C.

In the past, it has been customary to employ thermocouples as temperature regulating or measuring apparatus and while such devices operate satisfactorily in places where considerable temperature variations are permissible, they are not sufficiently sensitive in some cases where the maintenance of a given temperature within very narrow limits is necessary.

An object of the present invention is to provide an improved regulator and indicating apparatus which is capable of maintaining the temperature of a given heated body within close limits, or which will measure the temperature accurately. Another object is to provide a device of this character which is of rugged and simple construction.

Figure 1:
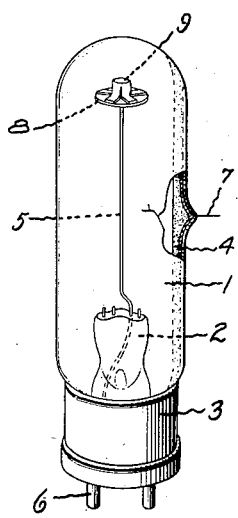
Figure 2:
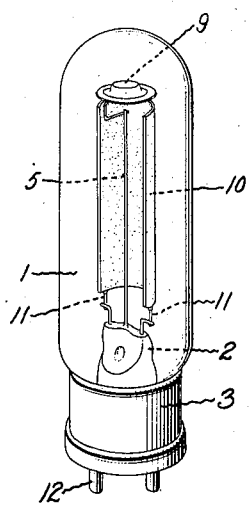
Figure 3:
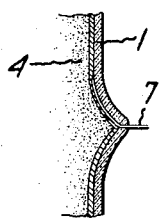
Figure 4:
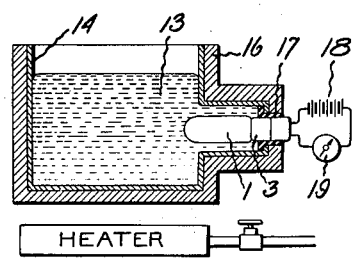

These, and other objects are attained in brief by providing an apparatus of the electron type which is of a highly sensitive and rugged character and in which the rate of generation of electrons is a function of the temperature change in the range within which the device is to be operated. The variations in the electron stream produced in this manner make themselves manifest in an outgoing circuit as changes of electrical current which may be used to operate measuring instruments or to control relays for regulating temperature. The invention will be more completely understood when reference is made to the following description taken in connection with the accompanying drawings in which Fig. 1 is a view in perspective of the improved temperature control device; Fig. 2 illustrates a modification; Fig. 3 is an enlarged fragmentary cross-sectional view of the flush seal employed in the form of device exemplified in Fig. 1; while Fig. 4 shows the improved device adapted to control or measure the temperature of a liquid material.

Referring to Fig. 1, numeral 1 designates an evacuated envelope which terminates in a press 2 and is secured to a base 3 of standard form. Within the envelope there is a cathode 4 and an anode 5, the latter being preferably constituted of a wire which extends along the longitudinal axis of the envelope. The anode is connected to any form of external contact, for example, to one of the contact pins 6, the remaining pins, of which there are three, being dummies so that the base may be inserted into a standard four-pronged socket. The cathode comprises a material which I have found, in accordance with my invention, to emit electrons in substantial amounts when heated to a temperature within the operative range, the rate of emission having also been found to be a function of the temperature changes in this range. The temperature range within which my device finds particular utility is between the limits of 80° and 150° C. and resides in the most common range utilized in the arts which normally calls for accurate control.

The cathode 4 which cooperates with the anode 5 in accordance with my invention to produce the novel results referred to, is constituted of an alkali material in the form of a thin layer or coating which adheres tenaciously to the interior surface of the envelope in one of the embodiments of my invention. This material, which preferably comprises a compound of caesium although rubidium may also be used to advantage, is applied to the envelope in a manner similar to that employed in connection with photoelectric cells and is covered broadly in an application filed in the name of K. T. Bainbridge, January 4, 1928, Serial No. 244,533, entitled "Photo-electric cells and a method for preparing the light sensitive surface therefor." However, it is to be distinctly understood that the device with which the present invention is concerned is not a photo-electric tube and is not dependent for its operation, upon activation by light.

After affixing the rod anode in place and forming the flush seal from which a conductor 7 may be brought out for connecting to external circuits, the interior surface of the envelope is treated with a conducting material. This treatment may consist of electrically sputtering silver or platinum on the treated surface as a thin coat or simply painting the glass surface with a silver, platinum or graphite-containing solution. A layer of silver is then electrolytically deposited in the well-known manner, on the coat thus formed. The device may be placed in an exhaust oven and baked to a temperature of about 360° C. and after thorough evacuation of the envelope, the deposited layer is oxidized. This is accomplished by admitting oxygen into the envelope until a pressure about 1 m. m. of mercury is obtained and then applying a high voltage direct current between the anode and cathode members. The necessary voltage (about 1000 volts) conveniently may be derived from an alternating current primary supply, stepped-up through a transformer and rectified by any suitable apparatus. When the desired degree of oxidation has been effected, the excess oxygen may be pumped out and a metal which emits electrons readily at low temperatures, such as cæsium or rubidium, is introduced into the envelope.

The alkali metal is preferably obtained by the pellet method. The anode 5 carries a circular plate 8 upon which is mounted a capsule 9 containing a pellet of a cæsium dichromate and silicon mixture so that when the capsule is heated by being immersed in a high frequency electric field, cæsium vapor is released from the capsule which thereupon condenses on the oxidized metal coating to form a thermionically emitting surface, which is probably constituted of oxides and sub-oxides of cæsium. The layer of oxygen serves as a glue for binding the alkali material to the foundation metal so that the active material is tenaciously held. The amount of alkali thus absorbed may be greater than would be required to cover a smooth metal surface owing to the greatly increased area of the spongy oxidized surface. Considerable improvement in operation has been noted when the device is immersed for several minutes after seal-off, in a heated oil bath, the temperature of which is maintained at approximately 200° C.; the compositions and effectiveness of the active surface, consequently the operating range of the device depends to some extent upon the duration of the heat treatment. The base 3 is thereafter secured to the envelope and connection made between one of the four contact pins and the anode 5.

Fig. 2 shows a modification of the improved temperature regulator in that the substance which emits electrons when subjected to heat within a certain range of temperature is formed on a metal member 10 positioned apart from the envelope. However, inasmuch as there is a space between the active member and the envelope to which the heat is applied, a construction of this sort is characterized by a time lag between the external changes in temperature and the variations of electron emission; accordingly, the utility of this form of device is limited to conditions where the temperature variations are not rapid. The active member may take the form of a semi-cylinder, the major axis of which conforms to the longitudinal axis of the envelope as shown, or may be constituted simply of a flat metal plate or a plurality of plates disposed angularly with respect to one another. The member 10 may be fabricated of copper, nickel, tungsten, molybdenum or other metal which oxidizes readily, altho I have found that silver or a metal upon which silver has been deposited serves most satisfactorily for the purpose described. This member is supported from the press 2 by stiff wires, 11, arranged at suitable places along the lower edge of the member 10, one of the wires being connected to a contact pin 12. As in the modification previously described, there is a capsule 9 containing alkali material in pellet form positioned on the top of the anode 5 for producing an electron emitting surface on the member 10 which has been oxidized in the manner described.

It has been found that a device made in the manner hereinbefore set forth constitutes sensitive apparatus in responding to minute changes in temperature particularly in the range of 80° to 150° C. The cathode surface gives values in thermionic emission in contradistinction to photo-electric emission at these relatively low temperatures; a surface of approximately 18 sq. cm. produces a thermionic current of the order of 3 microamperes at 130° C. It is not advisable to employ a device of the character described at a temperature above 200° C. because the alkali layer begins to disintegrate and below 80° C. the thermionic emission is too small to be utilized in practice. The thermionic emission in the temperature range referred to varies nearly twenty times as rapidly as the change in temperature thus offering marked advantages over thermocouples in this respect. This temperature range is very useful in the arts and includes the manufacture and treatment of enamels, chocolates etc., also the baking of bread, pastries and other food.

The improved temperature regulating and indicating device is shown in Fig. 4 as serving to indicate the temperature of a body of liquid 13. The liquid may be contained in a casing 14 adapted to be heated by a burner, the container having a layer 16 of heat insulating material. The regulator 1 is secured in the casing by means of liquid tight gasket 17, leads being brought out to a circuit which includes a battery 18 and a current meter 19 which may constitute a relay for controlling the fuel supply to the burner. It is evident that the meter 19 may be calibrated in terms of temperature so as to read directly the temperature of the liquid 13.

What I claim as new and desire to secure by Letters Patent of the United States, is:

1. A temperature responsive device comprising an evacuated envelope containing an anode and a cathode comprising a foundation of metal provided with an alkali layer, said layer being adapted to emit a substantial thermionic current when the device is subjected to a temperature in the range between 80° C. and 150° C.

2. A temperature responsive device comprising an evacuated envelope containing an anode and a metallic member coated with cæsium material, said material being adapted to emit a substantial thermionic current when the device is subjected to a temperature in the range between 80° and 150° C.

3. Means for regulating temperature within a predetermined range, said means comprising an evacuated envelope containing a foundation metal coated with a layer of alkali material, said material constituting a cathode and cooperating with an anode, said means being adapted to be subjected to a temperature in the range between 80° and 150° C. whereby to produce substantial thermionic current for regulating temperature.

4. In the art of fabricating a temperature regulator of the thermionic type comprising a highly evacuated envelope, a cathode and an anode between which a variable electrical discharge takes place in accordance with changes of temperature, the method of producing the thermionically active cathode which consists in applying a conducting material to the interior surface of the envelope, depositing a layer of silver on the conducting material, evacuating the envelope, oxidizing the silver, forming a coat of alkali material on the silver oxide, sealing the envelope and sensitizing the cathode by subjecting the envelope for a short time to a temperature appreciably above that at which the device is intended to operate.

In witness whereof, I have hereunto set my hand this 23rd day of April, 1929.

LEWIS R. KOLLER.